Patented July 31, 1934

1,968,794

UNITED STATES PATENT OFFICE

1,968,794

PROCESS OF MAKING SULPHURIC REACTION PRODUCTS OF ALIPHATIC ALCOHOLS

Heinrich Bertsch, Chemnitz, Germany, assignor, by mesne assignments, to American Hyalsol Corporation, Wilmington, Del., a corporation of Delaware No Drawing. Application March 6, 1930, Serial No. 433,815. In Germany March 6, 1929

29 Claims. (Cl. 260—99.12)

In my application Ser. No. 382,078 I have described a process of improving the moistening and permeating properties of certain liquids for treating textile matter, the said improvement being based on the addition of the products of sulphonation of the alcohols corresponding to the higher molecular acids of the fatty and oleic acid series. I have discovered that such additions for improving the efficiency of the said treating liquids are particularly suitable, which are produced by sulphonation of the fatty alcohols such as are produced from coconut oil or palm seed oil by esterification of the fatty acids with lower aliphatic alcohols and reduction of the mixture of esters. When starting from the fatty alcohols made from free fatty acids of the coconut oil or palm seed oil in a manner known per se by esterifying the fatty acids of the same with lower aliphatic alcohols and reducing the mixture of esters by means of sodium, it is advantageous to distill the reduction product and to use only the first 50 to 60% of the distillate. Thereby a product is obtained which mainly consists of lauryl alcohol containing also smaller quantities of myristyl alcohol and alcohols of a lesser number of carbon atoms. The higher fractions which mainly contain myristyl alcohol and octodecyl-alcohol are less suitable for the above mentioned purposes. By sulphonation with the known sulphonating media such for example as concentrated or fuming sulphuric acid, sulphur trioxide, chlorosulphonic acid, if desired together with further dehydrating media of organic or inorganic nature, the said lower fractions, which largely consist of lauryl alcohol give sulphonation products which are particularly effective in improving the liquids for treating textile matter. During sulphonation the basic materials are preferably heated to melting temperature and sulphonation is carried out at the said melting temperature or at a higher temperature. According to the conditions of the reaction or the intensity of the sulphonation depending on the character of the sulphonating media and the temperature, either sulphuric acid ester is obtained by reaction of the alcoholic hydroxyl group with the sulphuric acid residue or true aliphatic sulphonic acids in which the SO₃H group is directly bound to carbon, or mixtures or combinations of both types of sulphonation products.

The addition of lower or higher compounds of the series accompanying the derivatives of the lauryl alcohol forming the main component do not materially reduce the efficiency of the preparation.

Example 1.—100 kilogrammes of a mixture of fatty alcohols mainly consisting of lauryl alcohol, and obtained from coconut oil by esterification of the fatty acids with ethyl alcohol, reduction of the ethyl ester, distillation of the product of the reduction and collection of the first 50 to 60% of the distillate, are heated to melting temperature about 30° C. and sulphated at the said temperature with 50 kilogrammes of chlorosulphonic acid. The foregoing reaction may be represented by the following formula:

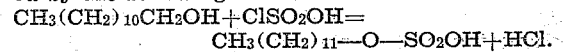

Example 2.—100 kilogrammes of the same mixture of fatty alcohols is sulphonated with 70 kilogrammes of fuming sulphuric acid at the temperature of 150° C.

The formula indicating the nature of the reaction in this example may be represented as follows:

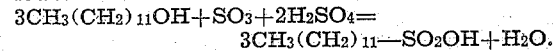

It should be understood that this formula is only illustrative of the sulphonation reaction, for instead the sulphonate group may replace a methylene hydrogen atom.

The products of the above reactions are directly neutralized by means of soda lye and separated by known methods from inorganic components such as sodium sulphate or sodium chloride.

The preparations which are thus obtained and which largely consist of the products of sulphation or sulphonation of the lauryl alcohol are very stable, very soluble in water, they are quickly acting moistening and foaming bodies which are particularly suitable for textile purposes and for purposes of the leather industry, the pharmaceutical industry, in the art of working metal, for manufacturing insecticides and dust binding media, in ceramics, and as a foaming fire extinguishing medium in which case 5% thereof may be added to a 10% solution of sodium bicarbonate and containing sulphuric acid as a fire extinguishing medium. Also the said preparations may be used wherever moistening, permeating, introducing of active components, emulsifying, cleaning and softening properties or the forming of protective colloids are desired.

The true sulphonic acids of the fatty alcohols obtained by energetic sulphonation at elevated temperature, as has been described in Example 2, and in which the sulphonic group is directly bound to carbon are valuable for the reason that they do not split off sulphuric acid even when drying and calendering textile matter at elevated temperature, which splitting off of sulphuric acid from unstable acid compounds of the fats and oils and similar substances used for sizing purposes frequently spoils the fibre.

By means of my improved process products are obtained from raw materials which can be readily obtained at low cost by a few operations, said products being of high value and suitable for many purposes.

Of course, for the purposes indicated, also the sulphation and sulphonation products of lauryl alcohol and related fatty alcohols made by other processes may be used. My process described above is simple and it supplies the said sulphation and sulphonation products at low cost.

This case is a continuation in part of applicant's copending application Serial No. 350,135, filed March 26, 1929, disclosing the production of sulphuric esters of alcohols corresponding to fatty and oily acids and their esters.

I claim:

1. The process of manufacturing sulphuric acid reaction products of higher molecular aliphatic alcohols which consists in producing alcohols from an acid mixture selected from the group of coconut oil fatty acids and palm seed oil fatty acids by esterifying said acids by means of lower aliphatic monohydric alcohols and reduction of the esters, and sulphonating said higher molecular aliphatic alcohols.

2. The process as claimed in claim 1 in which, by energetic sulphonation by means of a sulphonating and sulphating agent selected from the group consisting of sulphur trioxide, fuming sulphuric acid, and chloro-sulphonic acid, true aliphatic sulphonic acids are produced in which a methylene hydrogen atom is substituted in the aliphatic chain by the sulphonic acid group.

3. The process as claimed in claim 1 in which, by energetic sulphonation by means of a sulphonating and sulphating agent and a dehydrating medium, true aliphatic sulphonic acids are produced in which a methylene hydrogen atom is substituted in the aliphatic chain by the sulphonic acid group.

4. The process as claimed in claim 1 in which, by mild sulphation by concentrated sulphuric acid at a temperature not exceeding 35° C., sulphuric acid esters are formed in which the hydroxyl group of the fatty alcohol is esterified by a sulphuric acid group.

5. The process as claimed in claim 1, in which in the distillation of the raw mixture of alcohols the 50 to 60% of the fatty alcohols which are first distilled are used in the sulphonation.

6. A new chemical compound comprising a sulphuric reaction product of an alcohol selected from the group consisting of lauryl and myristyl alcohols.

7. A new chemical compound comprising a sulphuric ester of an alcohol taken from the class consisting of lauryl and myristyl alcohols.

8. A sulphuric ester of lauryl alcohol.

9. A sulphuric ester of myristyl alcohol.

10. True lauryl sulphonate.

11. Myristyl sulphonation product.

12. A salt of a sulphuric reaction product of an alcohol selected from the group consisting of lauryl and myristyl alcohols.

13. A salt of lauryl sulphuric acid.

14. A salt of myristyl sulphuric acid.

15. Sodium lauryl sulphate.

16. Sodium myristyl sulphate.

17. A soap-like material comprising essentially the sodium salts of the sulphuric esters of a mixture of primary lauryl alcohol and of primary myristyl alcohol.

18. A composition of matter, characterized by solubility in water and by foam-producing and dispersing properties, which comprises essentially salts of the acid sulphuric esters of primary lauryl alcohol and of primary myristyl alcohol.

19. A wetting and cleansing agent soluble in hard water which comprises a sulphuric reaction product derived from alcohols corresponding to the fatty acids of oils of the group consisting of coconut and palm kernel oils.

20. A reagent for wetting, permeating, producing foam, and dispersing, which comprises essentially primary sodium lauryl sulphate.

21. A reagent for wetting, permeating, producing foam, and dispersing, which comprises essentially a mixture of primary sodium lauryl sulphate and primary sodium myristyl sulphate.

22. In the production of wetting and cleansing agents, the combined steps of converting the carboxyl groups of fatty material selected from the group consisting of coconut and palm kernel oils to primary alcohol groups and then sulphating the resulting compounds.

23. The process of manufacturing wetting and cleansing agents which comprises reducing a fatty material, of which the fatty acids are of the group consisting of coconut and palm kernel oils, to form higher alcohols corresponding to the fatty acid radicals contained therein, distilling the resulting raw mixture of alcohols, sulphating the first 50% to 60% of the distillate to form alkyl sulphuric acids, and neutralizing with a base to yield water-soluble salts of said alkyl sulphuric acids.

24. The process of manufacturing sulphuric acid reaction products of higher molecular aliphatic alcohols which consists in producing alcohols from an acid mixture selected from the group consisting of coconut oil fatty acids and palm kernel oil fatty acids by esterifying said acids by means of lower aliphatic monohydric alcohols and reduction of the esters, and sulphonating said higher molecular aliphatic alcohols.

25. Sulphuric reaction product mixtures of alcohols obtained by reducing fatty acids of oils of the group consisting of coconut and palm kernel oils.

26. A soap-like composition of matter characterized by solubility in water and by foam producing and dispersing properties which comprises essentially a salt of primary lauryl sulphuric acid.

27. The process of manufacturing wetting and cleansing agents which comprises reducing a fatty material of the group consisting of coconut and palm kernel oils to form higher alcohols corresponding to the fatty acid radicals contained in said fatty materials, sulphating said higher alcohols to form alkyl sulphuric acids and neutralizing said alkyl sulphuric acids to produce water soluble salts of the alkyl sulphuric acids.

28. Sulphuric acid esters of an alcohol mixture consisting of a portion of the mixture of alcohols obtained by reducing to alcohols a fatty material selected from the group consisting of coconut and palm kernel oils.

29. Water soluble salts of the mixture of alkyl sulphuric acids defined in claim 28.

HEINRICH BERTSCH.